Patented July 17, 1923.

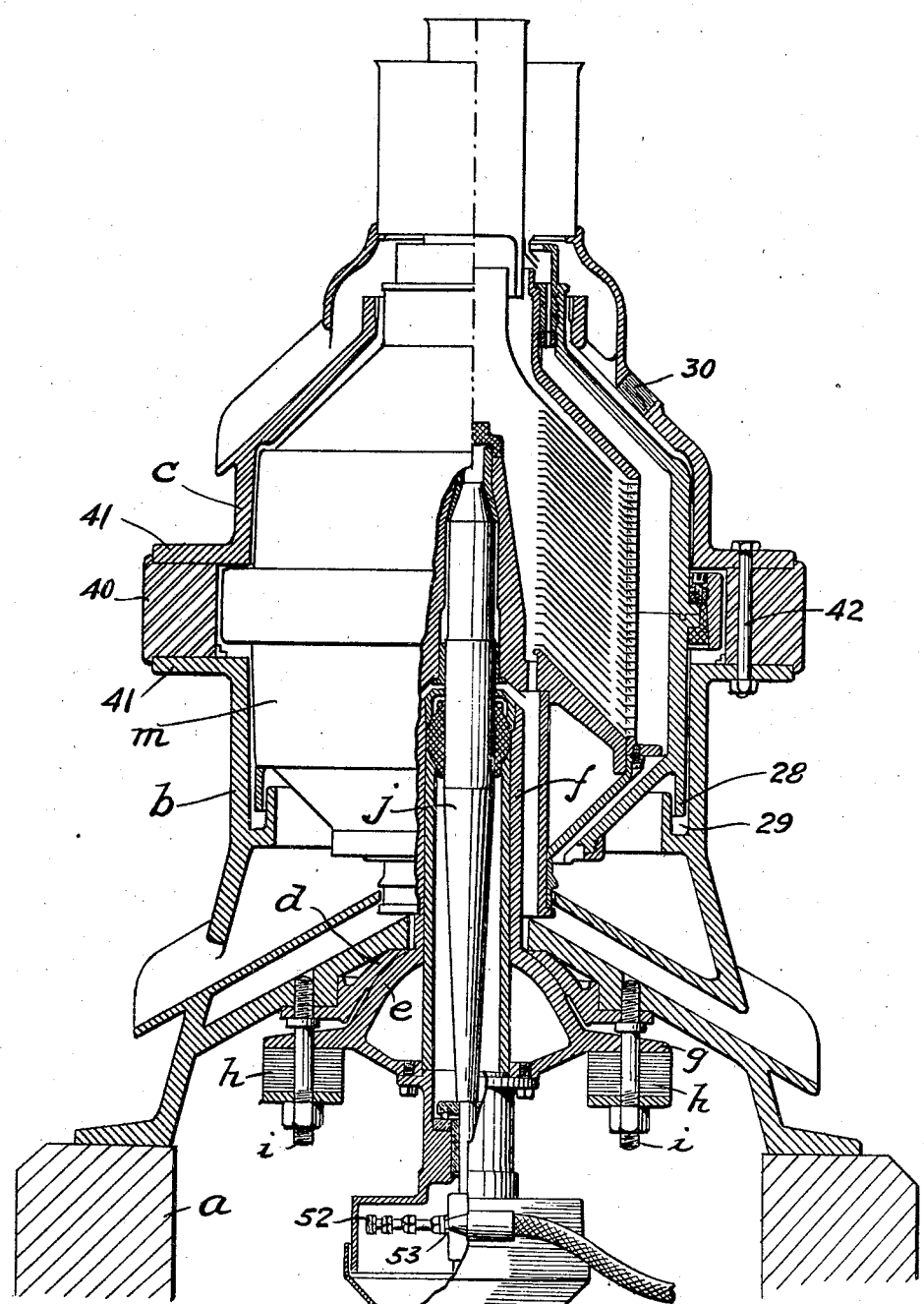

1,462,141

UNITED STATES PATENT OFFICE.

MEREDITH LEITCH, DECEASED, LATE OF POUGHKEEPSIE, NEW YORK; BY LUCY B. LEITCH, ADMINISTRATRIX, OF GORDONSVILLE, VIRGINIA, ASSIGNOR TO THE DE LAVAL SEPARATOR COMPANY, OF NEW YORK, N. Y., A CORPORATION OF NEW JERSEY.

BRAKING DEVICE FOR CENTRIFUGAL MACHINES.

Original application filed April 22, 1920, Serial No. 375,735. Divided and this application filed July 8, 1921. Serial No. 483,192.

*To all whom it may concern:*

Be it known that MEREDITH LEITCH, deceased, late a citizen of the United States, residing at Poughkeepsie, county of Dutchess, and State of New York, did in his lifetime invent certain new and useful Improvements in Braking Devices for Centrifugal Machines, of which the following is a full, clear, and exact description, reference being had to the accompanying drawings, which form a part of this specification.

This invention relates to an improvement in braking devices for centrifugal clarifier or separator bowls, and forms a division of the application of Meredith Leitch, deceased, Serial No. 375,735, filed April 22, 1920.

The object of the invention is to provide a device of this character, whereby the rotation of the bowl can readily be stopped without subjecting the bowl or its spindle to stresses when braking, as well as a device which cannot cause any drag on the bowl when the brake is not in action.

The figure of the drawing is a vertical section, partially in elevation, of one form of centrifugal machine with one form of improved braking device constructed in accordance with the invention.

*a* is a masonry foundation, *b* the lower part of the frame and *c* the upper part of the frame. The two parts of the frame are spaced apart by means of a ring 40 which is interposed between flanges 41 on the respective frame sections, bolts 42 extending through the flanges and the ring. At *d* a sphere-like socket is attached to the frame and in it fits a part *e* of a tubular bearing carrying member *f* having a flange *g* supported by cushions *h* on bolts *i*. *j* is a spindle rotatably mounted in the member *f* which is arranged to be driven by rotor 52 connected thereto, and 53 is a jet nozzle therefor. Mounted on the upper end of the spindle *j* is the bowl *m* constructed and arranged as clearly set forth in the above entitled application.

Around the lower edge of the bowl is a depending ring or flange 28. The frame of the machine is made to fit as closely around the bowl as proper clearances will permit and is provided with a channel 29 to receive the ring 28. Near the top of the frame is a pipe connection 30.

When it is desired to stop the bowl, the power is shut off and water is passed through the inlet 30 to the space between the bowl and the casing and, by liquid friction, soon brings the machine to a standstill. The ring 28 running in the channel 29 acts to prevent too free an escape of water from the braking space.

This admission of water to the space between the bowl and frame or bowl casing will equally counteract the rotation of the bowl *m* around the entire periphery thereof so that the bowl will not be subjected to any shock. After the bowl has stopped rotating, the water supply is shut off and the water between the bowl and casing will drain off through the outlet.

The advantages of this invention result from the provision of a fluid brake for the bowl, which can readily be applied, which will be equally and gradually applied to the entire circumference of the bowl and thereby avoid subjecting the bowl to any shock which would tend to rupture the bowl or bend the spindle, as well as a brake which will automatically free itself when the brake is thrown out of action.

Having now fully described this invention, what is claimed and desired to be protected by Letters Patent is:

1. A centrifugal machine comprising a revoluble bowl having a spindle and a bowl casing closely surrounding the bowl, there being a liquid inlet to the space between the bowl and casing, there being an annular outlet surrounding the spindle, and means to retard escape of said liquid from said space, thereby stopping the bowl by liquid friction between the opposing walls of the bowl and casing.

2. In a centrifugal separator, the combination with a centrifugal bowl, means for rotating the bowl, of an outer stationary casing, means for filling the space between the bowl and shell with a braking liquid, and means for substantially equally draining the liquid from all portions of the lower portion of the space between the bowl and casing.

3. In a centrifugal separator, the combination with a rotatable bowl, of an outer relatively stationary casing having an opening for admission of a braking liquid and provided with a circumferential channel of relatively small radial dimensions within which the lower edge of the bowl shell is positioned, the liquid admitted through the opening being free to outflow through the channel under the lower edge of the bowl shell.

4. In a centrifugal separator, the combination with a rotatable bowl, of an outer relatively stationary casing having an opening for admission of a braking liquid and provided with a circumferential channel of relatively small radial dimensions, a downwardly extending annular flange on the bowl within the channel, the liquid admitted through the opening being free to outflow through the channel under the lower edge of the flange on the bowl.

In testimony of which invention, I have hereunto set my hand, at Gordonsville, Va., on this 26" day of June, 1921.

LUCY B. LEITCH,
*Administratrix of the estate of Meredith Leitch, deceased.*